United States Patent [19]

Flickshu et al.

[11] 4,216,545
[45] Aug. 5, 1980

[54] METHOD AND APPARATUS OF COMMUNICATING EMERGENCY SIGNALS FROM A TRANSCEIVER IN A TRANSCEIVER COMMUNICATION NETWORK, PARTICULARLY FOR CITIZEN-BAND EMERGENCY USE

[75] Inventors: Peter Flickshu, Hildesheim; Diethard Wenzel, Nordstemmen, both of Fed. Rep. of Germany

[73] Assignee: Blaupunkt Werke GmbH, Hildesheim, Fed. Rep. of Germany

[21] Appl. No.: 912,044

[22] Filed: Jun. 2, 1978

[30] Foreign Application Priority Data

Jun. 15, 1977 [DE] Fed. Rep. of Germany ....... 2726865

[51] Int. Cl.² .............................................. H04B 1/40
[52] U.S. Cl. .......................................... 455/77; 455/79; 455/1; 455/99; 340/52 H; 340/32
[58] Field of Search ................... 325/15, 21, 22, 25, 325/35, 53, 54, 117, 131, 132, 57; 179/2 E; 340/32, 33, 22, 53.9, 52 R, 52 H; 343/175

[56] References Cited

U.S. PATENT DOCUMENTS

| | | | |
|---|---|---|---|
| 3,441,858 | 4/1969 | Graham | 325/117 X |
| 3,461,423 | 8/1969 | Trumble | 325/117 X |
| 3,584,303 | 6/1971 | Guanella | 325/131 |
| 3,660,811 | 5/1972 | Vail et al. | 340/33 |
| 3,710,313 | 1/1973 | Kimball et al. | 325/131 X |
| 3,990,040 | 11/1976 | Gleitz et al. | 340/52 H |
| 4,048,561 | 9/1977 | Wilcox et al. | 325/22 |

OTHER PUBLICATIONS

Plain English Rules–Citizens Band Radio Service.

*Primary Examiner*—Benedict V. Safourek
*Attorney, Agent, or Firm*—Frishauf, Holtz, Goodman & Woodward

[57] ABSTRACT

To alert users of Citizen-Band (CB) radios of an emergency situation, a CB transceiver has a tone generator associated therewith generating an emergency signal, for example a high pitched tone. Upon operation of an emergency switch, the transceiver is placed in the "transmit" mode, and the channels thereof are selectively stepped through for transmission, each one of the channels being modulated by the emergency high pitched tone signal generated in the emergency tone generator; the transceiver, finally, reaches a predetermined channel, for example channel 9, reserved for emergency communication and is thereupon switched to receiving mode. The emergency switch can be incorporated as part of an impact switch in a motor vehicle, thereby sending out the emergency signal, automatically, upon collision, and alerting other users of CB equipment that an emergency exists, regardless of the channels on which the other users may be operating.

8 Claims, 1 Drawing Figure

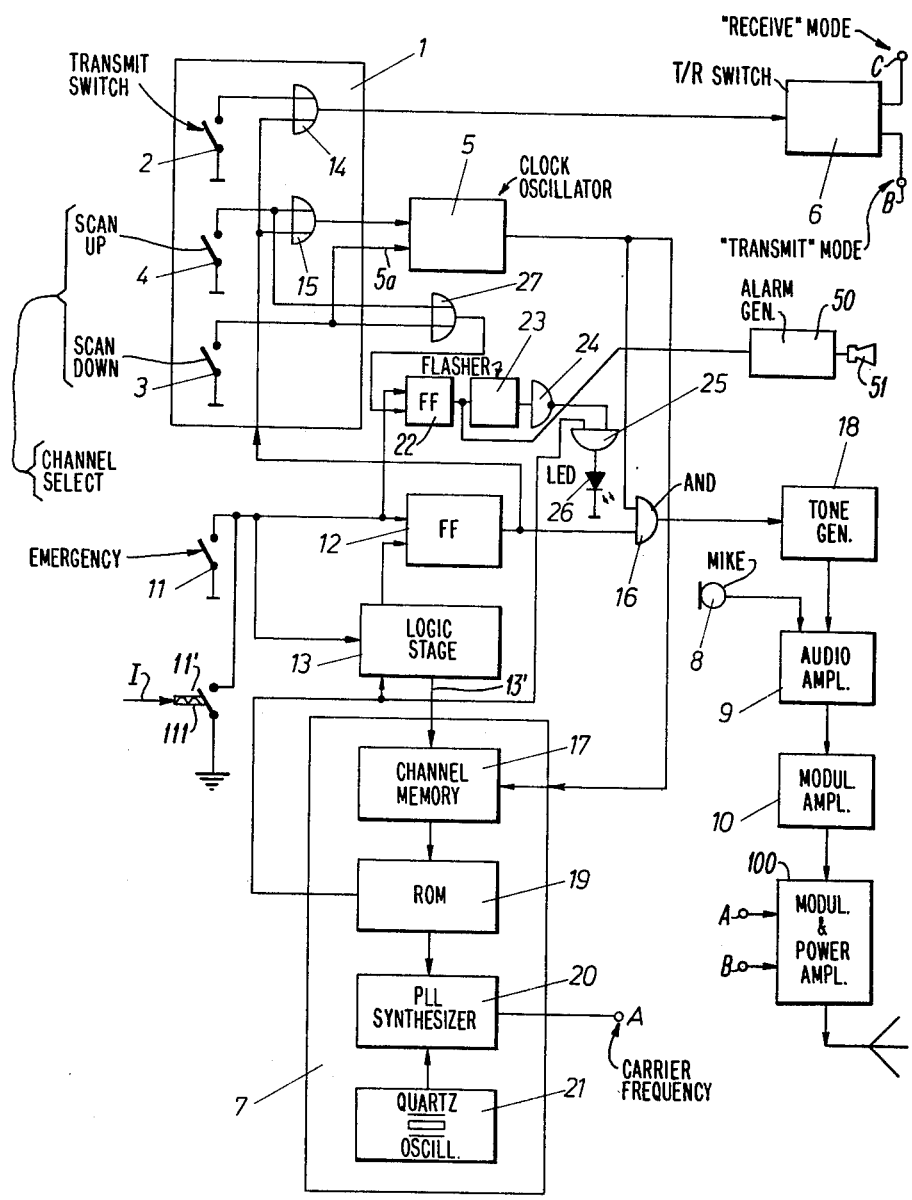

METHOD AND APPARATUS OF COMMUNICATING EMERGENCY SIGNALS FROM A TRANSCEIVER IN A TRANSCEIVER COMMUNICATION NETWORK, PARTICULARLY FOR CITIZEN-BAND EMERGENCY USE

The present invention relates to a radio communication network and a method of network radio communication, and more particularly to alerting users of Citizen-Band (CB) radios of an emergency condition.

BACKGROUND AND PRIOR ART

Citizen-Band (CB) radio networks utilize one specific channel—in the United States channel 9—as an emergency channel. Channel 9 is assigned a frequency of 27.065 MHz by the Federal Communications Commission. This channel is to be used only for emergency information. If some CB user is confronted with an emergency, he cannot, however, reach other CB users unless the other users, by chance, have their CB set tuned to channel 9.

THE INVENTION

It is an object to provide a system and method to reach all CB users within the broadcast range of a CB set at which an emergency condition exists, independently of the particularly channel to which the respective CB users have tuned their own sets; and, additionally, to automatically reach such other users in case of mobile installations of the CB set, for example in an automotive vehicle, upon occurrence of a collision.

Briefly, an emergency switch is provided, connected to the CB set which initiates generation of an emergency signal. Additionally, a clock generator is started which, sequentially, tunes the transmitter of the set through the various channels of the set while modulating the transmission by the emergency signal. After all the channels have been scanned, that is, have transmitted the emergency signal, the CB set is switched to the receive mode and set to receive information on channel 9.

In accordance with a feature of the invention, the emergency switch is formed by, or connected in parallel to, an impact sensor switch which automatically energizes the CB set and transmits the emergency signal, scanned over the various channels, if the impact switch is operated. A visual and other indication of the emergency condition, and that the CB set is transmitting the emergency signal, can also be provided.

The system thus permits reaching all CB users who have their sets active, within the transmission range of the emergency signal generating CB set, so that all CB users will be informed in the shortest possible time that an emergency condition exists within the transmission/reception range of the usual CB equipment. This information is transmitted by use of only a single emergency switch, and can be triggered automatically, a substantially safety feature if, for example, the user of the CB set subject to the emergency is injured or otherwise disabled from using his set to call for assistance.

Drawings, illustrating a preferred example, wherein the single FIGURE is a schematic block circuit diagram of a CB receiver equipped with an emergency calling system, and also used in explaining the method. The drawing is schematic and those portions of a CB set which are standard and well known have been omitted.

The CB receiver has an operating control portion 1 having a transmit switch 2, and channel select switches 3,4, of which channel select switch 3 is used for downward scanning of channels, one-by-one, and channel selector switch 4 is used for upward scanning of channels, from a predetermined set position. Operation of switch 3, 4 triggers clock oscillator 5 which, sequentially, controls selection of frequencies representative of the respective channels, in upward or downward direction, respectively. The transmit switch 2 is connected to a transmit/receive (T/R) switch 6 which has outputs B and C to, respectively, place the CB transceiver in the "transmit" mode, or "receive" mode, as selected by the T/R switch 6. The transceiver itself is illustrated only insofar as is necessary for an understanding of the present invention. Upon operation of the transmit switch 2, the T/R switch places the transceiver in the "transmit" mode, for example by energizing terminal B.

Channel selection is effected by operation of either one of the switches 3, 4. The clock pulses derived from clock oscillator 5 are then connected to a frequency generating stage 7 which causes sequential scanning or stepping of channels. The frequency generating stage 7 has an output terminal A at which the frequencies associated with the respective channels can be picked off.

A microphone 8 is connected to an audio amplifier 9 which, in turn, is connected to a modulation amplifier 10. Modulation amplifier 10 is connected to a modulator and power amplifier 100, controlled for transmission from terminal B, energized if the T/R switch 6 is in the "transmit" mode, and from terminal A, which determines the carrier frequency of the power amplifier 100. The parts so far described are standard and customary in many CB sets.

In accordance with the present invention, an emergency switch 11 is provided which is connected to the SET input of a flip-flop (FF) 12. Switch 11 is additionally connected to a logic stage 13, the logic function of which will be explained below. The output of FF 12 is connected to inputs of OR-gates 14, 15, respectively, which receive as their other inputs connections from the transmit switch 2 and the channel selector 4, respectively. The output of OR-gate 14 controls the T/R switch 6, the output of the OR-gate 15 is connected to the clock oscillator 5. Clock oscillator 5 can also be controlled by a second input from down-scanning channel selector switch 3. The output of clock oscillator 5 is connected to one input of an AND-gate 16, the other input of which is connected to the output of FF 12. Clock oscillator 5 is, additionally, connected to the channel selector 7 and, specifically, to a channel memory 17 which is the count input of a counter memory, part of the frequency generating stage 7.

The output of AND-gate 16 is connected to an emergency signal generator 18 which, in its simplest form, is a tone generator generating, for example, a single frequency of about 2500 Hz, interrupted by short pauses. Other emergency signals, as desired, can be generated by the tone generator 18 and the emergency signal may, also, be a short emergency message which, for example, is prerecorded or stored and repetitively reproduced, in short and collectively referred to as "emergency signal". The output of the emergency signal generator 18 is connected to the audio amplifier 9, for subsequent transmission similar to information derived from microphone 8.

The frequency generating stage 7, essentially, includes the working memory 17 which is additionally controlled from the logic stage 13, and a read-only memory 19, storing fixed information. Further, the frequency generator stage 7 includes a phase-lock loop (PLL) synthesizer 20, controlled by the fixed value memory 19. A quartz oscillator 20 provides a frequency reference for the PLL. The output A of the PLL synthesizer 20 will then have a frequency appear thereat which is associated with that channel placed in the working memory 17 and which is used as the carrier frequency of the selected channel. The ROM 19 additionally is connected to the logic circuit 13. The logic stage 13 is connected to the reset input of FF 12.

It is desirable, although not necessary, to provide an optical indication that the CB is operating under emergency conditions. To provide such optical indication, the circuit is expanded by inclusion of an FF 22, connected to the emergency switch 11. FF 22 is connected to a flasher 23 which, in turn, is connected through an inverter 24 to an AND-gate 25, the second input of which is connected to the output from ROM 19. The output of AND-gate 25 is connected to ground, chassis or reference through a light-emitting diode (LED) 26. The FF 22 is reset by connection to the output of OR-gate 27, the inputs of which are connected to the channel selection switches 3, 4.

The switch 11, or an additional switch 11' connected in parallel thereto, preferably is an automatic emergency operating switch. If the CB set with the emergency calling feature is installed in an automotive vehicle, then switch 11' is preferably connected as an impact sensor switch, for example to one or both of the bumpers for front and rear impact shock absorbers of the vehicle. Impact shocks, schematically indicated by arrow I, will act on the impact shock transmission element 111 to close switch 11'.

Method of signaling, and operation: Upon closing of either one or both of the switches 11, 11', FF 12 is placed in SET state. Additionally, the logic circuit 13 is controlled to provide an output at line 13' to set the channel memory 17 to a predetermined channel corresponding to the emergency channel, that is, to channel 9.

Since FF 12 is set, OR gates 14, 15 in the control unit 1 are energized, thus setting the T/R switch 6 in the "transmit" mode and starting the clock oscillator 5 to emit clock pulses. During the time interval in which the output of clock oscillator 5 has a 1-signal level, for example a "high" signal, the AND-gate 16 is energized since FF 12 is SET and the emergency signal generator 18 is operative. It generates a plurality of signals, for example of a frequency of 2500 Hz, interrupted by short pauses. These signals are amplified in the audio amplifier 9, further amplified in the modulation amplifier 10 and transmitted, first, at the frequency at terminal A, that is, on the carrier frequency of channel 9, that is, 27.065 MHz. The ROM 19 is so programmed that, depending on the number appearing in the memory 17, the frequency portions in the PLL synthesizer 20 are so mixed that the output of stage 20 will have a frequency which is associated with the number existing at any one time in the channel memory 17. Thus, after the emergency signal is transmitted over channel 9, the next signal from clock oscillator 5 will change the channel memory 17 to channel 8, causing generation and transmission of emergency signals derived from emergency signal generator 18, for example the above referred-to interrupted signals of 2500 Hz at channel 8 on frequency 27.055 MHz, corresponding to channel 8.

Each subsequent clock pulse from clock oscillator 5 provides a further transmission frequency corresponding to the content of the channel memory 17 and synthesized by the PLL 20; thus, the channels will, selectively, be scanned and emergency signals as generated by generator 18 will be transmitted, sequentially, over the various channels corresponding to the respective transmission frequencies. A complete scanning of the various channels downwardly, for example from channel 9, can be carried out in about 2.5 seconds.

After the emergency signals have been transmitted over the various communication channels, the channel memory 17 will again have the number 9 appear therein, corresponding to the channel 9. When number 9 appears a second time, ROM 19 will provide a signal to the logic circuit 13 which will provide an output to reset FF 12. Consequently, the T/R switch 6 will be changed over to energize output terminal C and change the CB set to the "receive" mode. Resetting FF 12 also disconnects the emergency signal generator 18 since AND-gate 16 will block. The clock oscillator 5 is disabled.

Information can now be handled on the emergency channel 9. Other users of CB equipment, within the transmission range of the set which transmitted the emergency signal, will have been alerted by the high pitched intermittent tone from tone generator 18 to switch to channel 9 and they can now communicate either with the operator of the set which transmitted the emergency signal or listen to communications with the distressed operator, if he then transmits on channel 9 by operating his own transmit switch 2.

The optical indication, although not strictly necessary, is enabled when either one of the channel selection scanning switches 3, 4 is engaged to select channel 9, or if the emergency switch 11 or 11' is operated. Upon operation of either one of switches 3, 4 to scan through the channel memory 17, channel 9 will be found and at that time READ-ONLY MEMORY (ROM) 19 will be connected. This provides information to the logic stage 13 and, additionally, to the input of the AND-gate 25, that channel 9 is connected. The LED 26 will thus be energized, since the inverter 24 will provide a 1-signal, and LED 26 will light continuously. It will extinguish when channel 9 is no longer connected. If either one or both of the emergency switches 11, 11' are energized, the FF 22 is additionally SET, which then energizes the flasher 23. This causes the LED 26 to flash, and it will flash continuously for the entire duration of transmission of emergency information. Only after the switches 3, 4 have been operated and the emergency channel 9 is no longer in use, is it possible to reset FF 22, and thus terminate flashing.

In addition to the indications provided, it is possible to also provide acoustic information of emergency conditions, particularly in CB sets located in vehicles. The FF 22 is then connected to an additional alarm signal generator 50, the output of which is connected, for example, over an amplifier, to an acoustic source of the vehicle, for example the horn relay. If the electric network of the vehicle permits, output from FF 22 can be used directly, or merely through an amplifier to energize the horn relay or, alternatively, an emergency siren or the like can be activated.

The logic stage 13 can readily be modified to sense when the lowest channel number has been reached, for example by matching the channel appearing in memory 17 with a channel number stored in ROM 19, and then controlling the channel memory 17 to jump to the highest channel—currently channel 40—for subsequent stepping down until the emergency channel 9 is reached, rather than immediately returning to channel 9. This will extend the period of emergency calling, since a larger number of channels will be scanned. alternatively, the logic stage 13 can be so programmed that, upon first energization thereof due to closing of switch 11, 11', it places the highest possible number, currently number 40, into the channel memory 17 for subsequent stepping down until channel 9 is reached, thereby covering a larger number of channels than stepping down from channel 9; or, alternatively, starting with channel 9 as described, and scanning upwardly, rather than downwardly; this alternative can readily be accomplished with the circuit as described by connecting the second input 5a of the clock oscillator to the up-scanning switch 4, rather than to the down-scanning channel selector switch 3. The particular logic connection of the logic stage 13, itself, can be programmed in accordance with well known programming technology, using integrated circuits.

The entire emergency communication system, except switch 11, or 11', respectively, can be constructed as a hybrid circuit, for example in integrated circuit form as an attachment to, or a modification of standard CB sets.

Various other changes and modifications may be made within the scope of the inventive concept.

What is claimed is:

1. For use in a radio communication network,
   a transceiver operable in a predetermined number of communication channels (1–40) of respectively different predetermined frequencies, in which one of the channels is an emergency channel (Ch. 9) for transmission of emergency information, comprising
   a transmitter circuit (100);
   a transmit/receive switch means (6) controlling the mode of operation of the transceiver;
   modulating means (18) generating an emergency signal;
   an emergency switch means (11, 11');
   a clock source (5) generating a sequence of clock signals;
   control switch means (12) controlled by said emergency switch means (11, 11') and controlling
      (a-1) said transmit/receive switch means (6) to place the transceiver in "transmit" mode, and
      (b-1) the clock source (5) to supply clock signals;
   frequency generating means (7; 17, 19, 20, 21) capable of generating said respective predetermined frequencies, connected to and controlled by said clock source (5) to temporally sequentially generate said frequencies as controlled by sequential clock signals from said clock source, said modulating means (18) modulating the respective frequencies being generated for transmission by said transceiver in the transmit mode and thereby transmit on said channels, temporally, sequentially, said emergency signal;
   logic means (13) connected to said frequency generating means and determining when the frequency of the emergency channel (Ch. 9) is being generated by said frequency generating means as it temporally sequentially changes the frequency under control of said clock source (5), said logic means controlling said control switch means (12) to
      (a2) control the transmit/receive switch means (6) to place the transceiver in the "receive" mode, and
      (b2) discontinue application of clock signals from said clock source (5) to the frequency generating means, whereby the transceiver will be enabled to receive messages on said emergency channel (9) for other transmitters in the network.

2. Transceiver according to claim 1, wherein the frequency generating means comprises a working memory (17);
   a fixed value memory (19) and a phase-locked loop synthesizer (20) including a reference oscillator (21), said working memory, fixed value memory, synthesizer, and quartz oscillator being serially connected.

3. Transceiver according to claim 1, for use in a vehicular installation in which the vehicle has a least one impact absorbing bar,
   wherein said emergency switch means includes an impact switch (11') operated upon sensing of an impact of sufficient force representative of a collision of the vehicle, to thereby automatically activate the controlled switch means (12).

4. Transceiver according to claim 1, wherein the transceiver has a manual channel selection control means (3, 4);
   and further comprising an alarm condition indicator means (26) connected to and controlled by said emergency switch means (11, 11') and including a holding circuit (22, 24, 25; 13), said alarm condition indicator means indicating that the emergency switch means has been operated, the holding circuit maintaining said indicating means in indicating condition until the transceiver is restored to control by said manual channel selector control means (3, 4).

5. Transceiver according to claim 1, wherein said controlled switch means (12) comprises a flip-flop changeable to SET condition by said logic means (13), the flip-flop (12) being RESET upon recognition of the emergency channel by said logic means (13), the flip-flop controlling change-over of the transmit/receive switch means (6) between "transmit" and "receive" mode.

6. Transceiver according to claim 5, wherein the transceiver has a manual channel selection control means (3, 4);
   and further comprising an alarm condition indicator means (26) connected to and controlled by said emergency switch means (11, 11') and including a holding circuit (22, 24, 25; 13), said alarm condition indicator means indicating that the emergency switch means has been operated, the holding circuit maintaining said indicating means in indicating condition until the transceiver is restored to control by said manual channel selector control means (3, 4);
   and wherein the holding circuit includes a second flip-flop (22), a flasher generator (23) connected to and controlled by the output of said second flip-flop (22) and an inverter (24) connected to the output of the flasher generator;
   a logic AND-function gate (25) connected to the output of the inverter (24) and to said logic means (13) to permit the indicator means (26) to be enabled:

(a) continuously, upon recognition of said emergency channel (Ch. 9), or (b) intermittently flashing upon operation of said emergency switch means (11, 11') connected to said second flip-flop (22) in the holding circuit;

the manual channel selection control means (3, 4) being connected to said second flip-flop (22) to reset said second flip-flop upon operation thereof to thereby disable indication of selection of the emergency channel (Ch. 9) or scanning of all channels under control of said clock source (5), under emergency conditions.

7. Transceiver according to claim 5 or 6, wherein the circuit of the transceiver is a hybrid circuit, including integrated circuits.

8. Transceiver according to claim 5, wherein the frequency generating means comprises a working memory (17);
 a fixed value memory (19) and a phase-locked loop synthesizer (20) including a reference oscillator (21), said working memory, fixed value memory, synthesizer, and quartz oscillator being serially connected.

* * * * *